US012433383B2

(12) United States Patent
Loureiro Benimeli et al.

(10) Patent No.: US 12,433,383 B2
(45) Date of Patent: Oct. 7, 2025

(54) MULTIPURPOSE PIECE WHICH CAN BE ATTACHED TO A MOBILE PHONE AND IS EQUIPPED WITH SPECTACLES, A WRITING INSTRUMENT AND A FOLDING SUPPORT

(71) Applicant: Fermin Jaime Loureiro Benimeli, Barcelona (ES)

(72) Inventors: Fermin Jaime Loureiro Benimeli, Barecelona (ES); Sergio Rodriguez Campos, Barcelona (ES)

( * ) Notice: Subject to any disclaimer, the term of this patent is extended or adjusted under 35 U.S.C. 154(b) by 0 days.

(21) Appl. No.: 18/707,479

(22) PCT Filed: Nov. 2, 2022

(86) PCT No.: PCT/ES2022/000048
§ 371 (c)(1),
(2) Date: May 3, 2024

(87) PCT Pub. No.: WO2023/079194
PCT Pub. Date: May 11, 2023

(65) Prior Publication Data
US 2025/0040674 A1    Feb. 6, 2025

(30) Foreign Application Priority Data
Nov. 3, 2021    (ES) ................. ES202100436

(51) Int. Cl.
*A45C 13/10*    (2006.01)
*A45C 11/04*    (2006.01)
(Continued)

(52) U.S. Cl.
CPC .......... *A45C 13/1069* (2013.01); *A45C 11/04* (2013.01); *A45C 11/36* (2013.01);
(Continued)

(58) Field of Classification Search
CPC ..... A45C 13/1069; A45C 11/04; A45C 11/36; A45C 11/001; A45C 2200/15; H01M 1/0202
(Continued)

(56) References Cited

U.S. PATENT DOCUMENTS 10,652,681 B2    5/2020  Chen
2011/0303560 A1*  12/2011 Friedman ............... A45C 15/00
                                             206/216

(Continued)

FOREIGN PATENT DOCUMENTS

CN    201480342 U    5/2010
CN    204273510 U    4/2015
(Continued)

OTHER PUBLICATIONS

International Search Report for related patent application PCT/ES2022/000048 issued by the Spanish Patent & Trademark Office and dated Dec. 29, 2022, English translation provided.
(Continued)

Primary Examiner — Jacob K Ackun
(74) Attorney, Agent, or Firm — Hassan Abbas Shakir; Shakir Law PLLC

(57) ABSTRACT

A multipurpose piece, which can be attached to a mobile phone and which is equipped with glasses, a writing instrument and a folding support, the piece includes an accessory for personal use, provided with cavities, to which a mobile phone can be attached. The multipurpose piece has the form of a rectangular, prismatic hollow piece including a cavity for glasses on one of its shorter sides, the cavity housing glasses having a frame, temples, hinges and nose pads, another cavity for a writing instrument housing an instrument such as a Stylus, a regular pencil, pen, marker or similar, gripping recesses, a folding support that folds about
(Continued)

a shaft, attachment elements for attaching to the mobile phone, and a lightening of material in a particular location so as not hinder the operation of the lens of the attached phone.

20 Claims, 5 Drawing Sheets

(51) Int. Cl.
 *A45C 11/36* (2006.01)
 *H04M 1/02* (2006.01)
 *A45C 11/00* (2006.01)
(52) U.S. Cl.
 CPC ......... *H04M 1/0202* (2013.01); *A45C 11/001* (2025.01); *A45C 2200/15* (2013.01)
(58) Field of Classification Search
 USPC .................................. 206/320, 576, 37, 38
 See application file for complete search history.

(56) References Cited

U.S. PATENT DOCUMENTS

| | | | |
|---|---|---|---|
| 2016/0007704 A1* | 1/2016 | Liebers | A45C 11/04 206/38 |
| 2016/0007705 A1* | 1/2016 | Liebers | A45C 11/04 206/38 |
| 2016/0113368 A1* | 4/2016 | Tu | H04B 1/3888 206/45.23 |
| 2023/0127330 A1* | 4/2023 | Arama | A61C 19/02 206/63.5 |

FOREIGN PATENT DOCUMENTS

| | | |
|---|---|---|
| CN | 105959438 A | 9/2016 |
| CN | 109892783 A | 6/2019 |
| CN | 211744542 U | 10/2020 |
| CN | 214381021 U | 10/2021 |
| EP | 3188616 B1 | 4/2020 |
| ES | 0282012 A1 | 11/1962 |
| ES | 0224383 U | 11/1976 |
| ES | 1018364 U | 1/1992 |
| ES | 1018366 U | 1/1992 |
| ES | 1034913 U | 2/1997 |
| ES | 1045335 U | 8/2000 |
| ES | 1060027 | 7/2005 |
| ES | 1126430 | 10/2014 |
| ES | 1212963 U | 5/2018 |
| ES | 1233379 | 8/2019 |
| ES | 1248634 U | 6/2020 |
| ES | 1250944 | 8/2020 |
| ES | 1258611 | 12/2020 |
| ES | 2807788 T3 | 2/2021 |

OTHER PUBLICATIONS

Written Opinion of the International Searching Authority for related patent application PCT/ES2022/000048 issued by the Spanish Patent & Trademark Office and dated Dec. 29, 2022, English translation provided.

* cited by examiner

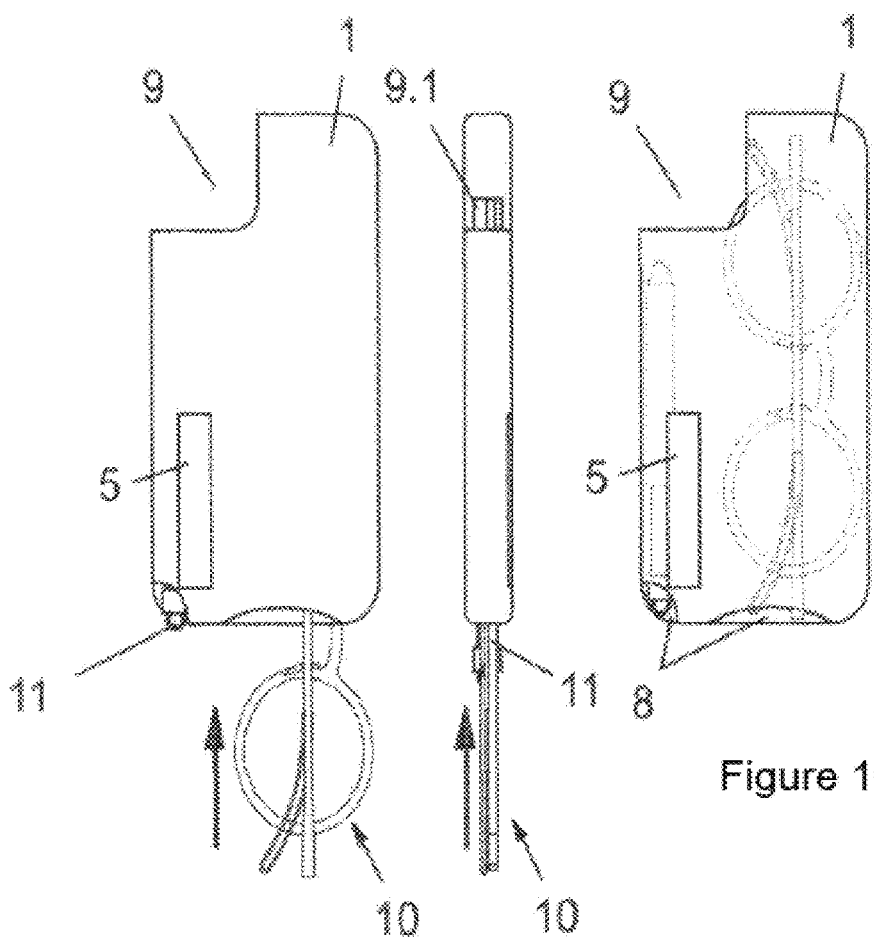

MULTIPURPOSE PIECE WHICH CAN BE ATTACHED TO A MOBILE PHONE AND IS EQUIPPED WITH SPECTACLES, A WRITING INSTRUMENT AND A FOLDING SUPPORT

CROSS-REFERENCE TO RELATED APPLICATIONS

This application is a national stage under 35 U.S.C. 371 of PCT patent application PCT/ES2022/000048 filed on 2 Nov. 2022, which is pending and which is hereby incorporated by reference in its entirety for all purposes.

PCT/ES2022/000048 claims priority to Spanish Patent Application U202100436 filed on 3 Nov. 2021, which is hereby incorporated by reference in its entirety for all purposes.

FIELD OF THE INVENTION

The present invention is directed to a device manufactured to allow the attachment of mobile phones thereon, being equipped with special glasses having a considerably curved and flexible frame, a writing instrument, preferably a stylus for interaction with smartphones or a conventional instrument such as a pencil, a pen or a marker, also incorporating a folding support that is flush with the body of the device, for looking at the attached phone comfortably when it is in both vertical and transverse orientations.

The device thus designed represents an interesting advantage for phone and glasses users since, in addition to having them together at all times, it serves to protect them, by way of a cover, occupying a volume similar to that of the mobile phone.

BACKGROUND OF THE INVENTION

The present invention falls within the sector of current necessities of life, chapter of personal or domestic objects in relation to objects for personal use, comprising, from the industrial viewpoint, the manufacture of covers, special glasses, complements and accessories for mobile phones.

Many registered prior art documents are known with respect to the association or attachment of bodies on mobile phones. Some documents describe security elements to prevent theft or occasional dropping of the phone "Security device for mobile phones and tablets" with application number U 201400502. Other documents, such as the one entitled "Mobile phone support" with application number U 200500913, describe a support for securing the mobile phone during the charging process.

Still other documents, which have emerged especially in the recent pandemic period of the year 2020, describe the attachment of containers to mobile phones.

One of said documents is entitled "Cover for a mobile phone with hydroalcoholic gel" with application number U 202000487 and another one with application number U 202000212 is entitled "Cover with a container and built-in atomiser for mobile phones".

Document entitled "Casing with refillable hollow cavities" with patent number ES-1212963 U describes a casing acceptable for mobile phones with a hollow and empty compartment to be filled by a disinfectant liquid.

The invention entitled "Dispenser for mobile phones" registered under number ES-1248634 U describes an element, in the form of a cartridge, which can be attached to a mobile phone.

With respect to the folding support, there are some registered prior art documents of which the one closest to the invention herein, which appears in the OEPM database, is the one entitled "Support for a mobile phone", with application number U 201900191, which describes a folding support that is placed directly on the phone instead of on the cover as it is now proposed.

Moreover, since glasses are an object for personal use that has been used for a very long time, it is normal that there are countless models of glasses that are being improved in terms of designs and quality since, in a way, glasses are part of the image that people transmit.

Moreover, since glasses are very delicate and fragile objects, there are also many prior art documents concerning covers and cases for the protection thereof.

Some registrations appearing in the Spanish Patent and Trademark Office are mentioned below by way of example.

1—ES-0224383 U Improved cover for glasses
2—ES-0282012 U Cover for glasses to transport same on automobile
3—ES-1018364 U Improved folding glasses with an integrated case
4—ES-1018366 U Improved retractable integrated glasses-case with solar protection
5—ES-1034913 U Improved cover for glasses
6—ES-1045335 U Improved case for glasses
7—ES-2807788 T3 Case for glasses The first registration is characterised by having a clip which allows securing the cover and glasses in the mouth of any pocket.

The second registration describes a cover which, secured on the front dashboard of an automobile, serves to protect the glasses of the user and keep them in place at all times.

The third invention describes folding glasses the temples of which also serve to perform the functions of a cover. It is an invention relatively close to that of the present document since it describes flat glasses which, in a folded position, occupy a minimum volume.

The fourth invention also describes folding glasses the very structure of which serves as a case for their protection.

The main feature of the fifth invention is that the cover is transparent and permits viewing the contents thereof.

The sixth invention describes a case which not only serves to store the glasses but also to contain in an orderly manner a cleaner for their lenses.

The seventh invention describes a clip-type cover which allows protecting the glasses while occupying a minimum volume.

In view of the existing prior art documents, the inventors of the present invention are not aware of any invention that describes a solution such as the one included in this document, which is why they consider it to be an interesting novelty due to its simplicity, economy and the advantages it incorporates.

SUMMARY DESCRIPTION OF THE INVENTION

As indicated above, the invention describes a multipurpose piece for personal use to which a mobile phone can be attached, with the advantage that it also serves as a cover for special glasses and a housing for holding a stylus-type writing instrument or similar. Furthermore, by having a folding support, it allows looking at the phone hands-free on a table both in a vertical orientation and in a transverse orientation and interaction thereof with the stylus, in the same way, if the smartphone so allows.

The multipurpose piece is a rectangular, prismatic hollow piece of the size of a regular mobile phone with a thickness similar to that of the phone itself, so it can be carried around comfortably.

The mobile phone can be freely coupled to said piece because it has attachment means, which can also be found in some of the most modern phones today.

In this embodiment, the multipurpose piece has a series of flanges that improve said attachment.

It has two cavities which can be made from one of the smaller side faces. One of the components of the invention consisting of glasses with a special design is housed in the first cavity.

The other cavity is suitable for housing a small writing instrument, both a tactile and a conventional writing instrument, which is very practical as it is possible to access same at any time.

Finally, it has on the outside of one of the larger side faces a folding support which allows placing the multipurpose piece in inclined positions in a stand-alone situation or with the phone attached.

The inventors conceive a second simpler embodiment which allows attaching several types and sizes of phones, since it is not limited by the fastening flanges existing in the first embodiment and in which the form of attachment can be by means of a double-sided adhesive which is attached directly to the phone or the protective casing thereof or providing means suitable for magnetic attachment to the protective casing of any phone, if this casing does not already have said means as standard.

The details which allow understanding the main features of the invention and the configuration of all the component elements are indicated in the figures included below, as an inseparable part of this document.

BRIEF DESCRIPTION OF THE DRAWINGS

Twenty schematic figures depicting the arrangement of all the component elements of the invention are included.

Figure 1:
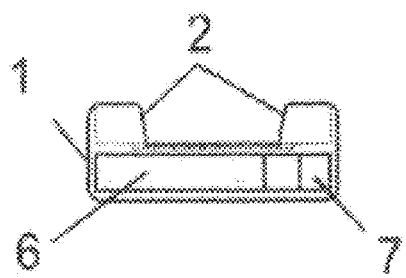
FIGS. 1, 2, 3, 4 and 5
Figures 2, 4, 5:
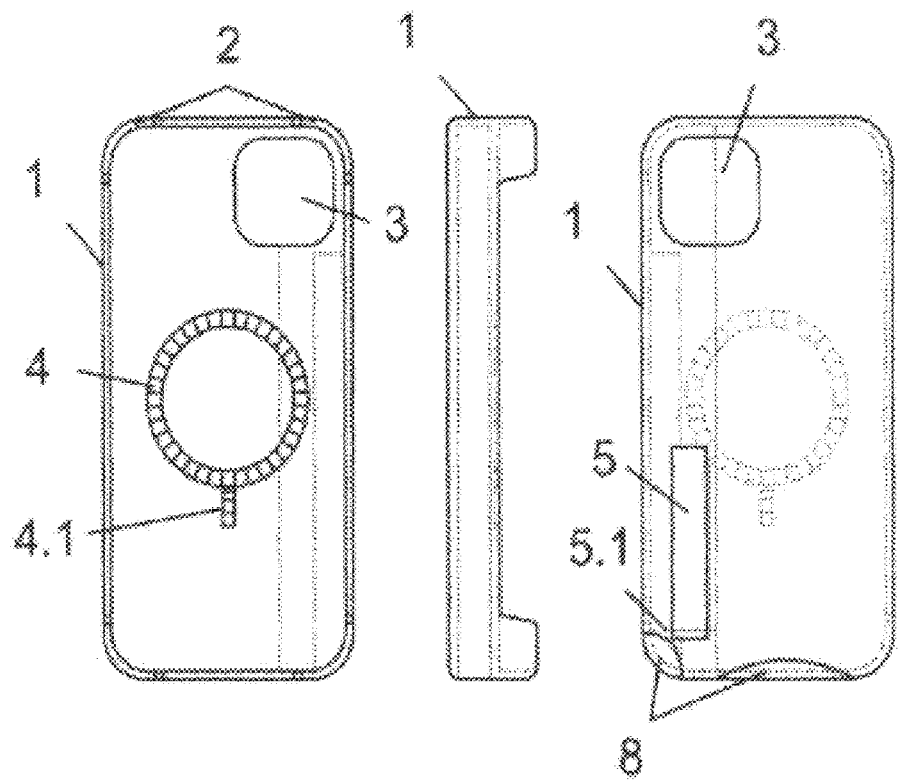
Figure 3:
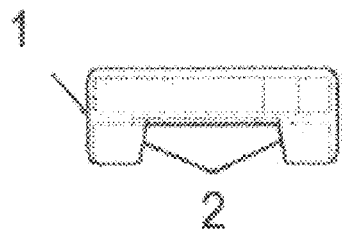
Figure 6:
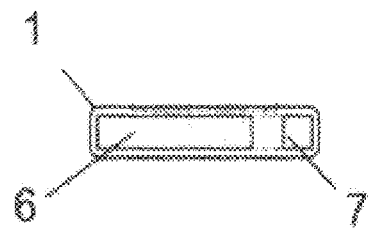
Figures 7, 9, 10:
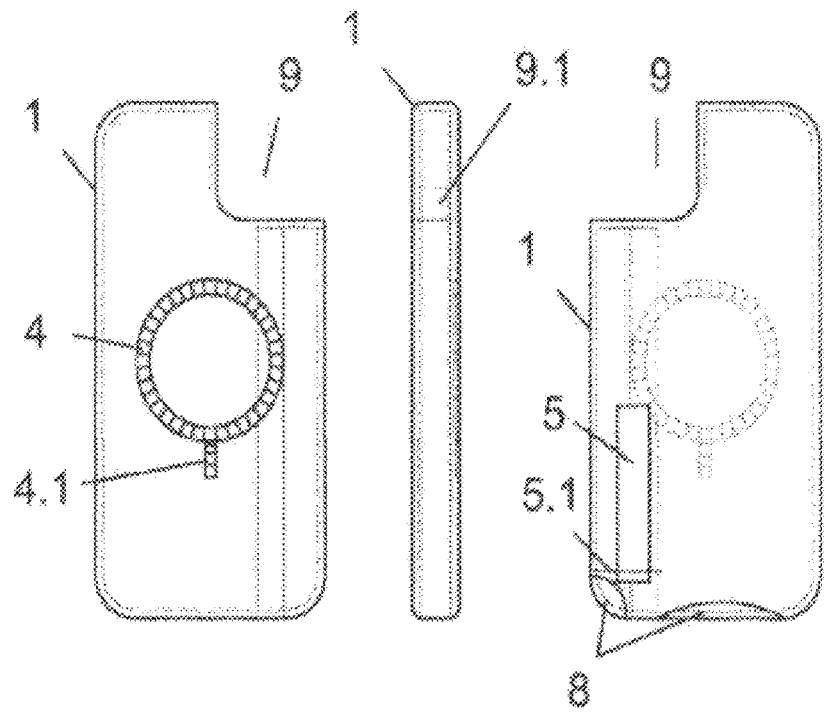
Figure 8:
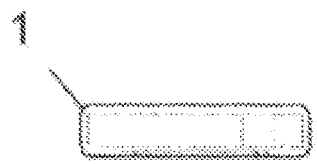

These figures depict a first embodiment of the multipurpose piece, without its associated components, in a view from the bottom part (FIG. 1), front view of the front side (FIG. 2), top view (FIG. 3), profile view (FIG. 4) and front view of the rear side (FIG. 5). The following elements are indicated:
  1—Multifunction piece
  2. —Flange
  3. —Window
  4. —Attachment element
  4.1—Centring leg
  5. —Folding support
  5.1. —Shaft
  6. —Cavity for glasses
  7. —Cavity for a writing instrument
  8—Gripping recess
FIGS. 6, 7, 8, 9 and 10

Figure 11:
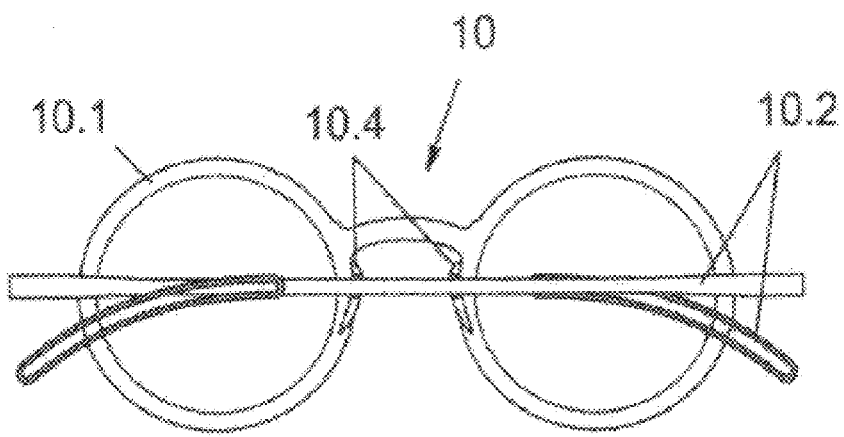
Figure 12:
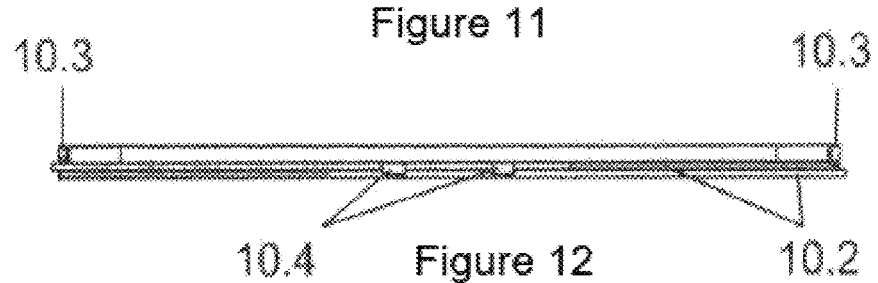

These figures depict the second embodiment of the multipurpose piece, without its associated components, in a view from the bottom part (FIG. 6), front view of the front side (FIG. 7), top view (FIG. 8), profile view (FIG. 9) and front view of the rear side (FIG. 10).
  9—Cutaway corner
  9.1. —Corner opening
FIGS. 11 and 12

These figures depict the front view (FIG. 11) and the top view (12) of the special glasses folded.

Figure 13:
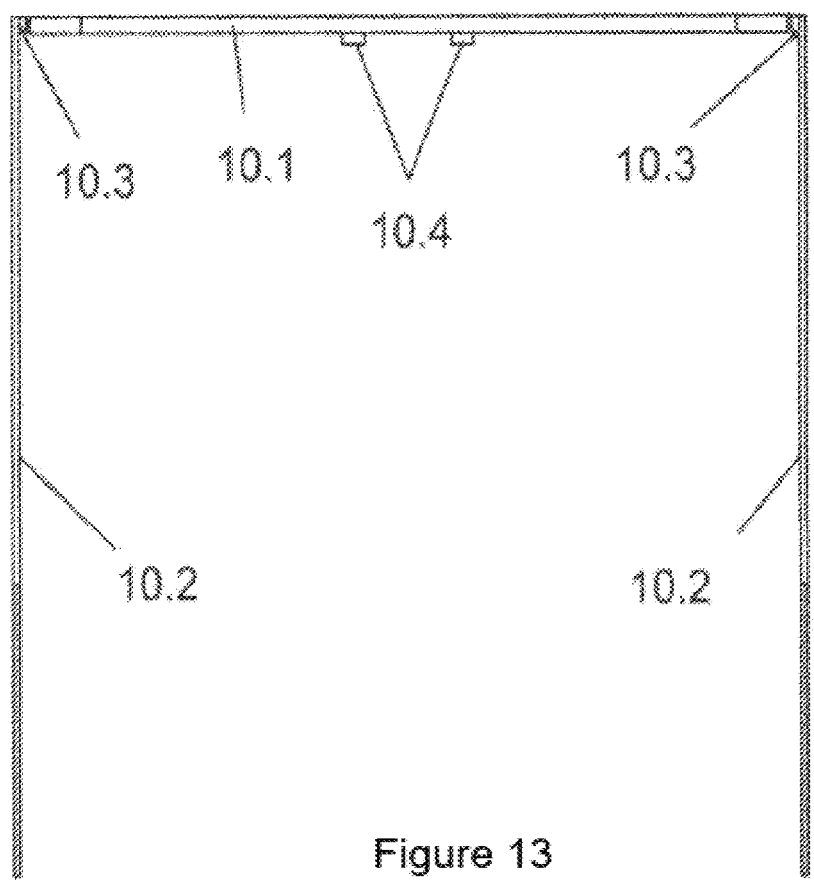

10. —Glasses
  10.1—Frame
  10 2. —Temple
  10.3. —Hinge
  10.4. —Nose pad
FIG. 13

This figure shows the glasses with their temples unfolded.
FIGS. 14, 15 and 16

These figures show the multipurpose piece, according to the second embodiment, with all the features thereof. It is insinuated in (FIGS. 14 and 15) the start of the introduction of the glasses and the writing instrument and these elements are shown to be completely introduced in (FIG. 16).
  11—Writing instrument
FIG. 17

This figure depicts a mobile phone attached to the multipurpose piece. The mobile phone before attachment is shown with a dotted line.
  12. —Mobile phone
FIG. 18

Figure 19:
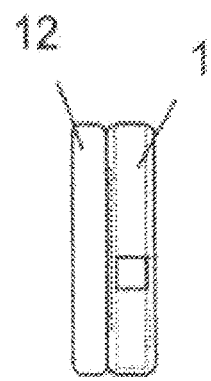
Figure 20:
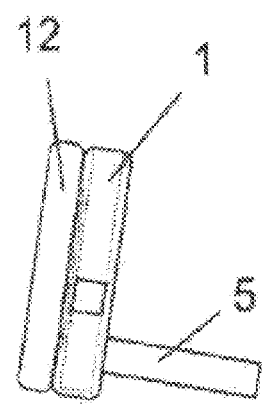

This figure depicts the grouping of the preceding figure with the support unfolded at a certain angle and the assembly placed to look at the phone in a vertical orientation.
FIGS. 19 and 20

Figure 17:
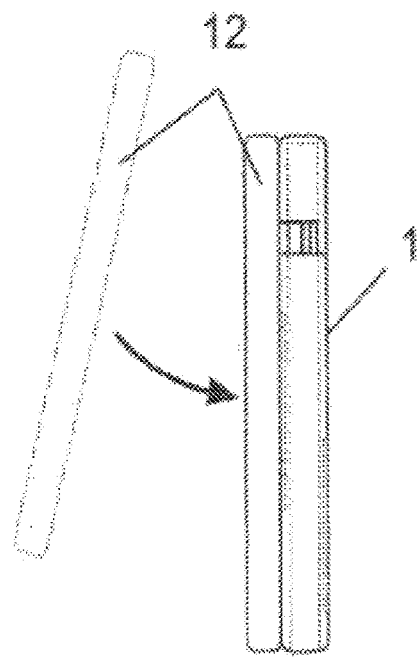
Figure 18:
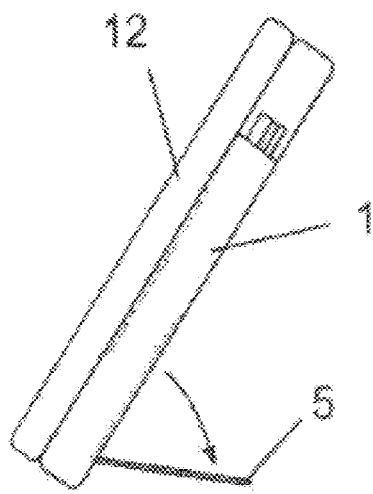

These figures depict the same grouping of FIGS. 17 and 18 arranged for looking at the phone in a transverse orientation.

DETAILED EXPLANATION OF EMBODIMENTS OF THE INVENTION

The present invention relates to a multipurpose piece acceptable for mobile phones which is equipped with glasses, a writing instrument and a folding support (FIGS. 1 to 20) consisting of an accessory for personal use, to which a mobile phone can be attached, with the particularity that it incorporates special glasses and a stylus-type writing instrument or similar, in addition to a folding support.

In a first embodiment (FIGS. 1 to 5), the multipurpose piece (1) is shown as a rectangular, prismatic hollow piece provided with flanges (2) in the four corners, having a lightening in the form of a through window (3) in the top right corner when seen frontally from the side where the phone is attached (FIG. 2). This window is sized to prevent interferences with the lens of the cameras of the mobile phones.

The same figure (FIG. 2) also shows an attachment element (4) in the shape of a circular crown with magnets which, being embedded in the multipurpose piece, is arranged flush with the surface, having a centring leg (4.1) which secures the position of the phone in certain cases.

There can be seen on the rear front side (FIG. 5) the existence of a folding support (5) which rotates about the shaft (5.1) and also two gripping recesses (8) the function of which is to facilitate the gripping of the complementary elements of the invention which, as will be seen below, are introduced in the cavity for glasses (6) and the cavity for writing instrument (7) that have been depicted in (FIG. 1).

In this first embodiment, the phone which is fastened to the multipurpose piece (1) is coupled to said piece as a result of the existence of the attachment element (4) with magnets, reinforcing the attachment by means of the flanges (2). This, with the subsequent advantages inherent to fastening safety, has the drawback that the multipurpose piece (1) must be sized for specific phones that fit precisely between the flanges (2).

For this reason, the inventors preferably favour another solution which represents a second embodiment depicted in (FIGS. 6 to 10) in which the significant similarity existing with respect to the first solution can be seen, with the main difference in this case being the lack of the incorporation of flanges (2) and the reduction of material in the cutaway corner (9) which is equivalent to the window (3). In turn, the cutaway corner (9) creates the corner opening (9.1) which slightly increases the capacity of the cavity for glasses (6).

The advantage of this second embodiment with respect to the first embodiment is that the size of the phone (with various dimensions on the market) does not condition the attachment thereof to the multipurpose piece (1).

This structuring of the multipurpose piece (1) allows introducing therein two accessories which, being part of the invention described herein, represent attractive advantages particularly for people who use glasses.

One of these accessories is the one depicted in (FIGS. 11, 12 and 13) showing special glasses (10) with the frame (10.1), temples (10.2), hinges (10.3) and nose pads (10.4) thereof.

These flexible and slightly curved glasses (10) have the particularity that they occupy, in the folded position thereof, a very small volume which allows the introduction thereof in the cavity for glasses (6). In the stored position, the glasses are completely flat as a result of the flexibility thereof which in turn favours the stability thereof inside the multipurpose piece, preventing accidentally dropping same.

The glasses are glasses in which one of the temples (10.2) thereof, when folded, establishes perfect contact with the frame (10.1) and the other temple (10.2) is in perfect contact with the preceding temple in the folded position. This requires a special sizing of the hinges (10.3), with one of them being slightly smaller than the other, thereby optimising the total thickness since the nose pads (10.4) do not exceed the sum of the thickness of the frame (10.1) and of the two temples (10.2).

The other complementary accessory is a writing instrument (11) which in (FIGS. 14 to 16) has been depicted as a stylus for interaction with the attached smartphone, although it can also be a regular pencil, a pen, a marker or similar piece. It is insinuated in (FIGS. 14 and 15) the start of the introduction of the glasses (10) and a stylus (11) in the multipurpose piece (1) which obviously acts as a cover or case for both accessories, as shown in (FIG. 16), where they are completely stored and protected, and where it is also observed that they can be readily retrieved as a result of the existence of the gripping recesses (8). Likewise, it is observed that the glasses (10) protrude slightly from the corner opening (9.1).

Finally, (FIGS. 17 to 20) show the usefulness of the multipurpose piece (1) in terms of the attachment of a mobile phone (12) thereto and the extraction of the folding support (5) which allows providing certain inclination to the assembly for looking at the phone both in a vertical orientation (FIG. 18) and in a transverse orientation (FIG. 20).

The two described embodiments solve the most common cases which usually occur in practice. However, the summary of variants that may arise based on the type of phone and the solution proposed by the inventors is indicated below.

a) A multipurpose piece (1) with flanges (2), described in the first embodiment, with a magnet-type attachment element (4).

In this case, it is suitable for a phone having dimensions similar to those of the multipurpose piece, of the types which incorporate, by default, another internal magnet.

b) A multipurpose piece (1), described in the second embodiment, with a magnet-type attachment element and a regular phone without attachment elements.

In this case, there is a need to have a protective casing for the phone (manufactured from plastic) of the types having incorporated therein a magnet-type attachment element (4).

c) A multipurpose piece (1), described in the second embodiment, with a magnet-type attachment element (4) and a regular phone without attachment elements.

In this case, there is a need to have a protective casing for the phone of the types which, instead of a magnet, incorporate a ferromagnetic sheet.

d) A multipurpose piece (1), described in the second embodiment, manufactured without attachment elements (4).

In this case, a double-sided adhesive-type attachment element (4) is added to the multipurpose piece.

It is not considered necessary to make the contents of this description more extensive so that a person skilled in the art can understand the scope and advantages derived from the invention, as well as develop and put into practice the object thereof. However, it should be understood that the invention has been described according to preferred embodiments thereof, so it may be susceptible to modifications without this affecting or implying any alteration of the basis of said invention. In other words, the terms in which this preferred description of the invention has been set forth should always be interpreted in a broad and non-limiting manner.

The invention claimed is:

1. A multipurpose device comprising:
    an accessory for attachment of the multipurpose device to a mobile phone;
    wherein the multipurpose device is hollow and comprises a prismatic shape;
    a first cavity adapted to receive glasses;
    a second cavity adapted to receive a writing device;
    at least one recess adapted for reaching a device held in one or both of the first and second cavities; and
    a lightening of material of the multipurpose device or a window for not hindering operation of a lens of the mobile phone.

2. The multipurpose device of claim 1, wherein the at least one recess comprises a first recess for reaching the glasses when received in the first cavity, and a second cavity for reaching the writing device when received in the second cavity.

3. The multipurpose device of claim 1, wherein the at least one recess is arranged such that it is connected to an end of one or both of the first and second cavities.

4. The multipurpose device of claim 1, wherein the first cavity is adapted to receive the glasses in folded form.

5. The multipurpose device of claim 1, further comprising the glasses.

6. The multipurpose device of claim 5, wherein the glasses comprise:
    a frame, temples, nose pads and two hinges; wherein the glasses are curved and flexible;
    wherein a total thickness of the glasses is equal to or less than a sum of a thickness of the frame and a thickness of the temples;
    wherein a total thickness of the nose pads is equal to or less than the sum; and
    wherein a first hinge of the two hinges has a size smaller than a size of a second hinge of the two hinges.

7. The multipurpose device of claim 5, further comprising the writing device.

8. The multipurpose device of claim 1, further comprising the writing device.

9. The multipurpose device of claim 8, wherein the writing device is one of: a stylus, a pencil, a pen and a marker.

10. The multipurpose device of claim 1, wherein the accessory comprises at least one magnet.

11. The multipurpose device of claim 1, wherein the accessory further comprises at least one flange for attachment to the mobile device.

12. The multipurpose device of claim 1, wherein the accessory comprises double-sided adhesive.

13. The multipurpose device of claim 1, wherein the multipurpose device comprises the window.

14. The multipurpose device of claim 1, wherein the lightening of the material or the window is arranged on a corner of the multipurpose device, thereby providing a corner opening.

15. The multipurpose device of claim 1, further comprising a folding support that folds about a shaft, the folding support being adapted to form a folding stand.

16. The multipurpose device of claim 1, further comprising the mobile phone.

17. The multipurpose device of claim 16, wherein a thickness of the multipurpose device is equal to or smaller than a thickness of the mobile phone.

18. A protective casing for a mobile phone, the protective casing comprising:
a multipurpose device attached or attachable thereto;
wherein the multipurpose device comprises:
an accessory provided with cavities, the accessory comprising at least one attachment element for attachment of the multipurpose device to a mobile phone;
wherein the multipurpose device is hollow and comprises a prismatic shape;
wherein the multipurpose device comprises:
a first cavity adapted to receive glasses;
a second cavity adapted to receive a writing device;
at least one recess adapted for reaching a device held in one or both of the first and second cavities; and
a lightening of material of the multipurpose device or a window with no material of the multipurpose device for a lens of the mobile phone.

19. The protective casing of claim 18, further comprising at least one magnet or at least one ferromagnetic sheet, wherein the at least one magnet or the at least one ferromagnetic sheet receive attachment of the multipurpose device.

20. A mobile phone comprising:
a multipurpose device attachable to the mobile phone, and a lens;
wherein the multipurpose device is hollow and comprises a prismatic shape;
wherein the multipurpose device comprises:
a first cavity adapted to receive glasses;
a second cavity adapted to receive a writing device;
at least one recess adapted for reaching a device held in one or both of the first and second cavities; and
a lightening of material of the multipurpose device or a window with no material of the multipurpose device at least at a portion of the mobile phone where the lens is arranged.

* * * * *